United States Patent

Canfield et al.

Patent Number: 5,847,762
Date of Patent: *Dec. 8, 1998

[54] MPEG SYSTEM WHICH DECOMPRESSES AND THEN RECOMPRESSES MPEG VIDEO DATA BEFORE STORING SAID RECOMPRESSED MPEG VIDEO DATA INTO MEMORY

[75] Inventors: Barth Alan Canfield, Fishers; Wai-Man Lam, Carmel; Billy Wesley Beyers, Jr., Greenfield, all of Ind.

[73] Assignee: Thomson Consumer Electronics, Inc., Indianapolis, Ind.

[ * ] Notice: This patent issued on a continued prosecution application filed under 37 CFR 1.53(d), and is subject to the twenty year patent term provisions of 35 U.S.C. 154(a)(2).

[21] Appl. No.: 579,192

[22] Filed: Dec. 27, 1995

[51] Int. Cl.$^6$ .............................. H04N 7/12; H04N 11/02; H04N 11/04
[52] U.S. Cl. ............................................. 348/415
[58] Field of Search ...................... 348/390, 400, 348/401, 402, 409, 415–416, 411, 413; 382/233, 236, 232

[56] References Cited

U.S. PATENT DOCUMENTS

| | | | |
|---|---|---|---|
| 5,384,644 | 1/1995 | Yamagami | 358/426 |
| 5,576,765 | 11/1996 | Cheney et al. | 348/407 |
| 5,576,840 | 11/1996 | Fukushima | 386/46 |

FOREIGN PATENT DOCUMENTS

| | | | |
|---|---|---|---|
| 601 878 A1 | 6/1994 | European Pat. Off. | H04N 7/13 |
| 687 111 A2 | 12/1995 | European Pat. Off. | H04N 7/24 |

OTHER PUBLICATIONS

"Coding of Moving Pictures and Associated Audio, ISO/IEC JTC1/SC29/WG11 NO702," dated may 10, 1994.

Peng H. Ang et al., Video Compression Makes Big Gains, IEEE Spectrum, Oct. 1991.

IBM MPEG–2 Decoder Chip User's Guide, pp.: 1–2, 1–3, 1–5, 1–6, 1–8, 1–9, 2–6, 2–7 and 3–1, Jun. 1994.

*Primary Examiner*—Douglas W. Olms
*Assistant Examiner*—David R. Vincent
*Attorney, Agent, or Firm*—Joseph S. Tripoli; Eric P. Herrmann; Ronald H. Kurdyla

[57] ABSTRACT

An MPEG compatible decoder receives encoded, compressed data in the form of image representative pixel blocks. The decoder includes a frame memory (20) for storing reconstructed pixel blocks incident to the decoding process. The previously decompressed data is re-compressed (30) before being written to the memory. Stored decompressed data is decompressed for display (34, 26), or as needed for decoding functions such as motion compensation processing (32, 22). The compression performed before writing data to memory is block-based compression using compressed data from one of two different compression paths (FIG. 3, 314, 320) which compress a given pixel block simultaneously.

18 Claims, 4 Drawing Sheets

MPEG SYSTEM WHICH DECOMPRESSES AND THEN RECOMPRESSES MPEG VIDEO DATA BEFORE STORING SAID RECOMPRESSED MPEG VIDEO DATA INTO MEMORY

FIELD OF THE INVENTION

This invention concerns a system for processing an image representative digital signal. In particular, the invention concerns a memory management technique in an MPEG compatible image signal decoder.

BACKGROUND OF THE INVENTION

Rapid advances in digital signal processing technology have produced corresponding advances in digital image signal processing in various fields, including direct broadcast satellite and high definition television (HDTV), for example. The MPEG (Motion Picture Experts Group) signal processing standard (ISO/IEC 13818-2, May 10, 1994) is a related development. This widely accepted image processing standard has been found to be particularly attractive for use with satellite, cable and terrestrial broadcast systems including high definition television (HDTV) systems.

In an MPEG video signal decoder, more than one image frame of memory is typically needed for decoding an MPEG coded digital datastream, which represents I, P and B image frames as known. Three frames of memory are generally needed for decoding an MPEG datastream, two frames of memory are needed to store reference I or P frame data, and one frame of memory is used to store B frame data. For example, a conventional MPEG decoder in a direct broadcast satellite receiver decoder may contain 16 Mbits of random access memory (RAM), and an MPEG decoder in an HDTV system such as that proposed by the Grand Alliance in the United States will require approximately 80 Mbits of RAM. At the present time the cost of such amounts of RAM is significant. The need to limit memory requirements, particularly in consumer products such as video and television systems, is important to keep to costs of such products at a reasonable level.

SUMMARY OF THE INVENTION

In accordance with the principles of the present invention, it is herein recognized as desirable to manage the memory requirements of a digital image processing system efficiently, particularly in the case of MPEG compatible systems which may find extensive use in consumer products.

In an image signal decoder employing the principles of the present invention, previously decompressed image data is compressed before being written to memory used in the decoding process. In a disclosed MPEG compatible decoder embodiment, the data is compressed before being written to image frame memory, and the stored data is decompressed for display or when needed for MPEG decoding functions such as motion compensation processing.

In accordance with a feature of the invention, the compression is block-based compression using compressed data from one of two different compression paths.

DETAILED DESCRIPTION

Figure 1:
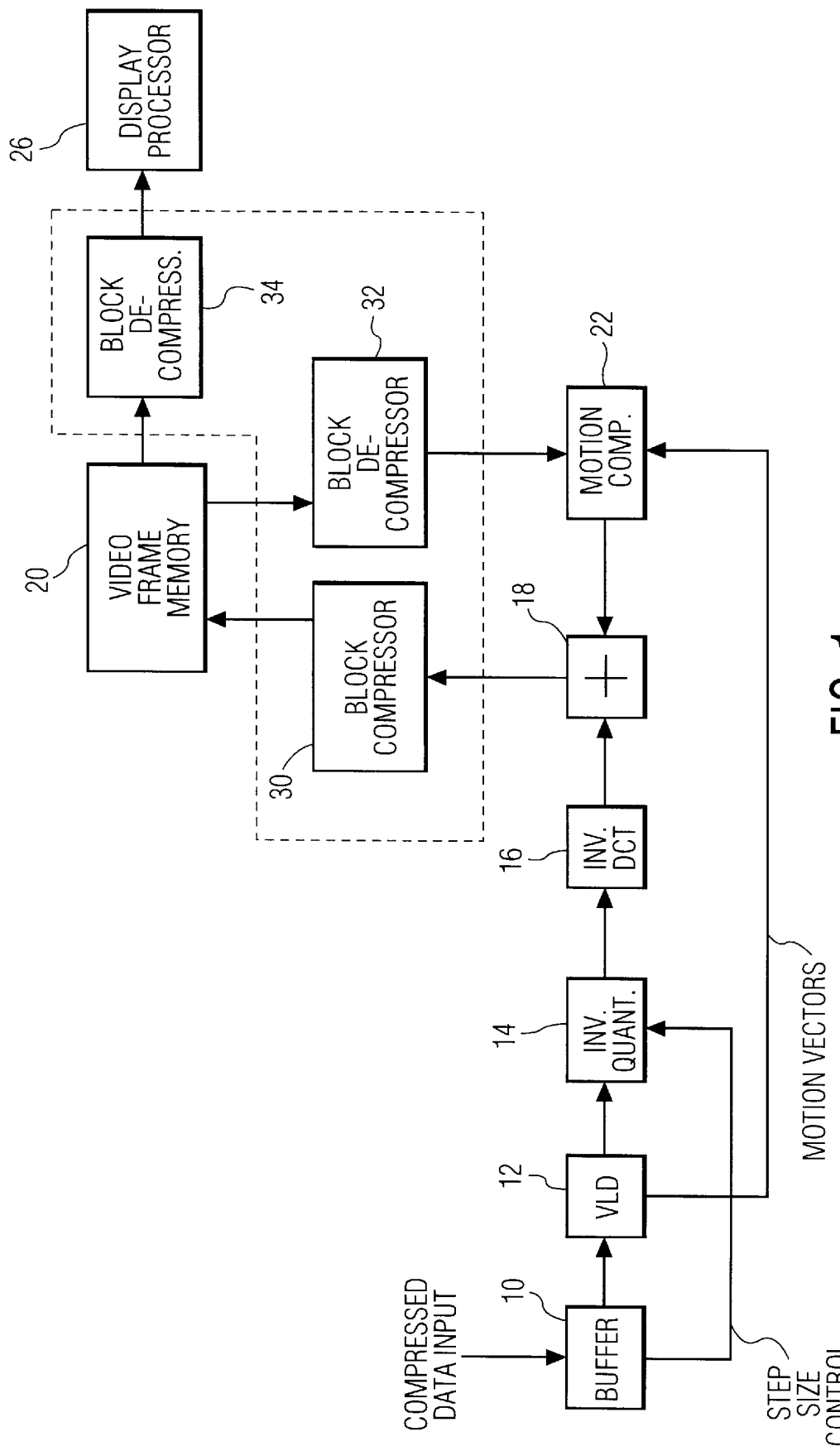
FIG. 1 is a block diagram of a portion of an MPEG decoder employing the principles of the present invention.

FIG. 1 depicts a portion of a video signal processor such as may be found in a television receiver or a satellite receiver. The video processor includes a conventional MPEG decoder constituted by blocks 10, 12, 14, 16, 18, 20 and 22. An MPEG encoder and decoder are described, for example, by Ang et al., "Video Compression Makes Big Gains," IEEE Spectrum, October 1991. In accordance with the principles of the present invention, the MPEG decoder additionally includes block compressor unit 30 for compressing data before being written to frame memory.

The system of FIG. 1 receives controlled datastream of MPEG coded compressed data from a preceding input processor, eg., a transport decoder, which separates data packets after input signal demodulation. The received data is in the form of data blocks representing 8×8 pixels (picture elements). This data represents both intraframe information that has been coded, and interframe predictive motion coded residual image information representing the image difference between adjacent picture frames. The interframe motion coding involves the generation of motion vectors that represent the offset between a current block being processed and a block in a prior reconstructed image. The motion vector which represents the best match between the current and prior blocks is coded and transmitted. Also, the difference (residual) between each motion compensated 8×8 block and the prior reconstructed block is DCT transformed, quantized and variable length coded before being transmitted. This motion compensated coding process is described in greater detail in the Ang, et al. article mentioned above.

The input compressed pixel data blocks are buffered by unit before being variable length decoded by unit 12. Buffer 10 exhibits a storage capacity of 1.75 Mbits in the case of a main level, main profile MPEG datastream. Decoded compressed data from unit 12 is decompressed by inverse quantization unit 14 and by inverse discrete cosine transformation (DCT) unit 16 before being applied to one input of an adder 18. The step size provided by inverse quantizer 14 is controlled by a signal from buffer 10 to assure a smooth data flow. Decoded motion vectors are provided from decoder 12 to a motion compensation unit 22 as will be discussed below. Decoder 12 also produces an inter/intra frame mode select control signal, as known, which is not shown to simplify the drawing. The operations performed by units 12, 14 and 16 are the inverse of corresponding operations performed at an encoder, eg., at a transmitter. The MPEG decoder of FIG. 1 reconstitutes the received image using known MPEG processing techniques which are described briefly below.

A reconstructed pixel block is provided at the output of adder 18 by summing the residual image data from unit 16 with predicted image data provided at the output of motion compensation unit 22 based on the contents of frame memory 20. When an entire frame of pixel blocks has been processed, the resulting reconstructed image is stored in frame memory 20. In the inter-frame mode, motion vectors obtained from decoder 12 are used to provide the location of the predicted blocks from unit 22.

The image reconstruction process involving adder 18, memory 20 and motion compensation unit 22 advantageously exhibits significantly reduced memory requirements due to the use of block based compressor 30 in accordance with the principles of the present invention. Specifically, the amount of memory required for frame memory 20 is reduced by a predetermined amount, eg., 50% (or more) as a function of the compression performed by unit 30. Additional details of compressor 30 will be discussed with respect to FIG. 3.

Figure 2:
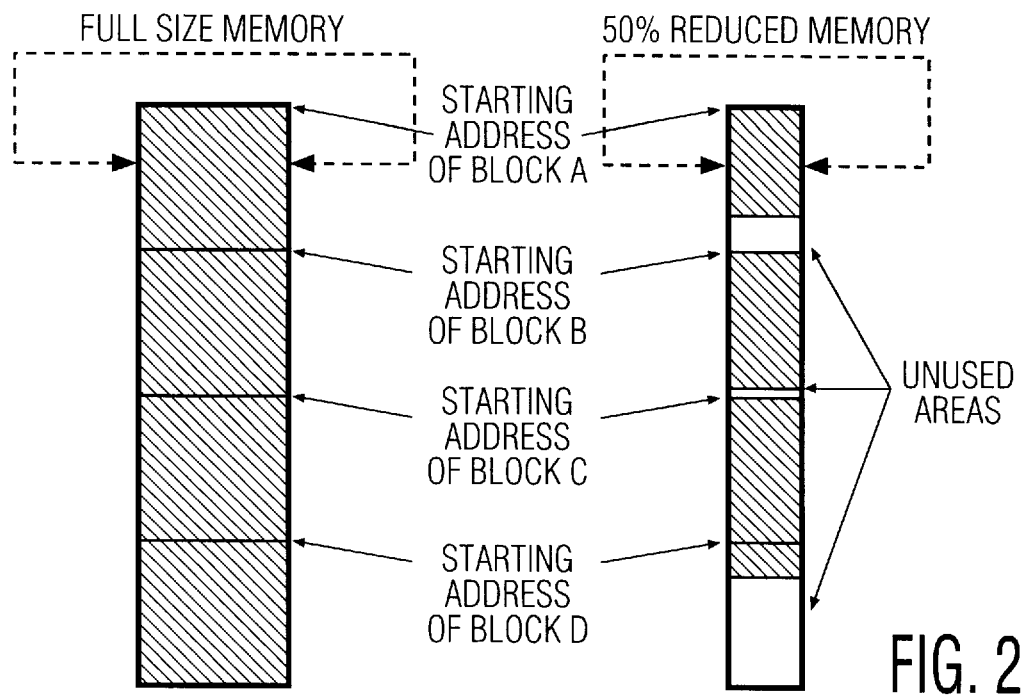
FIG. 2 depicts memory mapping for full and reduced memory situations.

A pictorial representation of the reduced memory requirements of memory device 20 is shown in FIG. 2. In FIG. 2, the memory map on the left represents a mapping of pixel blocks within a full size memory. The map on the right illustrates how a 50% smaller memory is used to store blocks compressed by unit 30. As will be seen from the following discussion of the compression network shown in FIG. 3, each block (eg., block C) is guaranteed to fit within 50% of the space normally required for a full size memory, or less. That is, the compression provided by unit 30 is 50% or more. In this example any unused memory space remaining after compression is left unused so that the starting position of the data for any block is a known location, or starting address.

In the full size memory, any particular pixel can be located and accessed because of a fixed mapping between the video frame pixels and the memory pixel addresses. The reduced size memory does not exhibit pixel-by-pixel mapping. Instead, pixel blocks are mapped into the memory. If a particular pixel from within a particular block is needed, it may be necessary to access the entire block of data.

A conventional MPEG 2 main level, main profile system (720×480 pixels) requires a frame memory capacity of 12,441,600 bits for storing three video frames. By compressing these frames 50% before storage in accordance with the present invention as discussed above, only 7,970,800 bits of memory are required for MPEG decoding. That is, 6,220,800 bits of frame memory for unit 20 and 1,750,000 bits of buffer memory for unit 10. Therefore if the system employs a typical 16 MBit external memory device, only about 8 Mbits of memory space are needed for MPEG decoding, leaving the remaining external memory capacity available for other purposes such as on-screen display, microprocessor RAM, transport buffers or other special buffers, for example. As smaller integrated circuits are developed, it may be possible to integrate the decoder memory on the same integrated circuit with the other decoder networks. Reducing the memory requirements in an HDTV decoder system will result in significant savings. For example, in the HDTV system proposed by the Grand Alliance in the United States, the frame memory requirement is 1920×1080×12×3=75,202,560 bits.

With 50% compression, the memory requirement is reduced to 37,601,280 bits.

The use of compression by means of compressor 30 prior to storing data in memory 20 requires that data be decompressed prior to unit 22 in the motion compensation processing loop. This is accomplished by block-based decompressor 32, which exhibits the inverse of the operation exhibited by compressor 32. Block-based decompressor 34 is similar to unit 32 and decompresses stored pixel blocks before being conveyed to a displayed processor 26. Processor 26 may include, for example, circuits for conditioning the pixel data for display, a display driver network, and an image reproducing device.

The described memory reduction technique may be used with an MPEG 2 main level, main profile decoder which is capable of decoding MPEG 2 datastreams with image resolution up to CCIR 601 (720×480 pixels). The technique is equally applicable to MPEG 1 datastreams, and to other image resolutions including high definition formats such as may be associated with broadcast, cable and satellite television signals, and other types of information bearing signals.

Data from stored anchor frames such as I frames is generally accessed in a random fashion according to the motion vectors received in the input compressed data stream. A block based compression scheme maintains reasonable accessibility of pixel data from the frame memory. An 8×8 pixel block has been found to work well with the disclosed compression scheme. Larger pixel blocks allow the use of sophisticated compression techniques at the expense of reduced pixel accessibility. Smaller blocks allow finer granularity in accessing pixels at the expense of fewer options for compression. Various types of compression, including quantization and transformation, may be used to implement the function of compressor 30 depending on the requirements of a particular system.

The type of compression used should preferably, but not necessarily, exhibit certain characteristics. Each block should be compressed a predetermined amount, or more, so that the location of each compressed block is easily determined, as discussed in connection with the memory mapping shown in FIG. 2. Each block should be compressed/decompressed independently of other blocks. Thus any block can be accessed without having to read any other block. Ideally the compression/decompression process should be lossless, but this cannot be guaranteed for any size block. Thus the compression/decompression process should not produce objectionable artifacts in a reproduced image.

Figure 3:
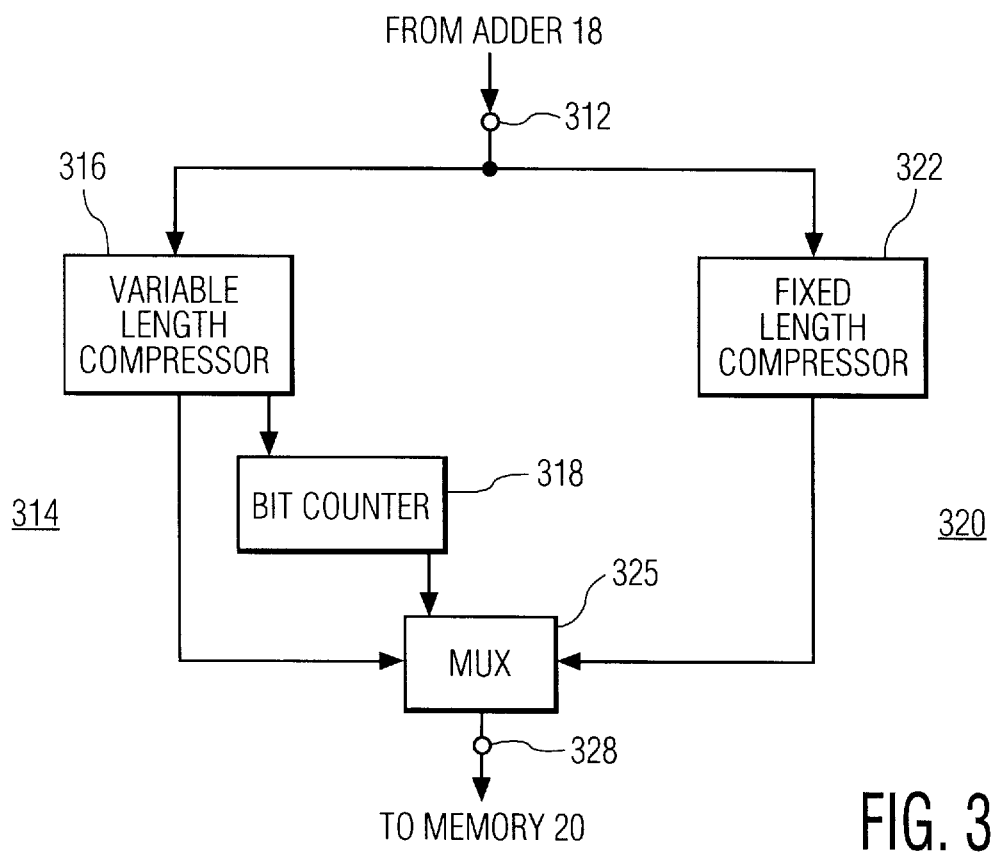
FIG. 3 is a block diagram of a compression network useful in the MPEG decoder of FIG. 1.

A particularly advantageous compression technique for use by compressor 30 is shown in FIG. 3. This compression technique uses a variable compression network in parallel with a fixed compression network. The compression networks operate concurrently on the same pixel block. The variable compression network has the advantage of being lossless or substantially lossless, and is the preferred compression network. If the variable compression network in not successful in achieving a predetermined desired amount of data compression, the output of the fixed compression network is used instead. While the fixed compression network can obtain the desired amount of compression, this network has the disadvantage of being lossy.

In FIG. 3, data from source 18 is applied to an input terminal 312 of a data compression network including parallel independent data compression paths 314 and 320. Path 314 is a substantially lossless path and includes a variable compression processor 316 which provides compressed data to one of the signal inputs of a multiplexer (MUX) 325, and a bit counter 318. Counter 318 monitors the bit count of each data block compressed by unit 316, and provides a switching control signal to a control input of MUX 325. Additional details of compression path 314 are shown and will be discussed in connection with FIG. 4. Path 320 is a lossy path which includes a fixed compression processor 322 as shown in greater detail in FIG. 5. Compressed output data from unit 322 is provided to another signal input of MUX 325. MUX 325 provides either the compressed data from path 314 or the compressed data from path 320 to an output terminal 328 of the compression network as will be explained in greater detail below. The output compressed data is provided to frame memory 20 of FIG. 1.

Block based compression network 314, 320 compresses each pixel block independently and essentially guarantees that each block will be compressed by a predetermined compression factor or more. The output of either compression path 314 or path 320 is selected for input to memory 20 so as to provide satisfactory image quality and the desired compression factor (50% in this example). Compression factors greater than 50% also may be used. However, it has been determined that compression factors not exceeding 50% produce good results. A compression factor of 25% is essentially transparent compared to conventional decoder processing without such compression. At 50% compression the results are less transparent, but the results are acceptable and are not considered to be significantly different compared to conventional decoder processing without memory reduction.

The multipath nature of the compression network achieves high image quality and assures that at least the fixed compression factor will be achieved. Variable compression path 314 exhibits lossless or near-lossless compression, but the number of output bits provided by path 314 is variable. The number of compressed block output bits from path 314 is monitored by counter 318. If the number of compressed block bits 314 is equal to or less than a predetermined target bit count associated with the predetermined compression factor, the compressed data output from path 314 is selected by MUX 325 and conveyed to memory 20. Otherwise, the compressed block output from fixed compressor 322 is used. Fixed compressor 322 uses a lossy compression routine with quantization to produce a fixed target bit output. To facilitate decompression, for each compressed block, each compression network inserts signalling information into the datastream to indicate the type of compression that was performed on the block. The signalling information could be one or more bits inserted at the beginning of each compressed data block, eg., in a header. The signalling bits are sensed by decompression networks 32 and 34 (FIG. 1) which perform the inverse of the. compression that was used to compress the block associated with the given signalling bits. The header may contain other control information, such as quantization control information for example.

Variable compression is preferably used in smooth areas of an image to avoid annoying contouring artifacts. Image quality is essentially guaranteed to be high over such areas because variable compressor 316 uses little or no quantization, which is a substantially lossless process. On the other hand, fixed compressor 322 may be used in image areas containing significant detail information. Since quantization noise in such areas is not likely to introduce much perceptible error, the perceived quality of an image area subjected to fixed compression in path 320 will very likely be good. However, it is not necessary to selectively use variable and fixed compression in this manner, although in many systems it will be beneficial to do so. The choice of which of the two compressed blocks to use is simply based on the bit count of the compressed block from variable compressor 316. If the bit count indicates that compressor 16 has achieved the desired compression, it is used. Otherwise, compressor 22 is used.

The block based compression performed by compression network 314, 320, and the independent compression of every block, allows a decoder to decode every block without needing information concerning any other block. Since each block is compressed by a predetermined compression factor, the memory address of the first pixel of each block is known in advance. Thus each block can be accessed from memory without information concerning any other block. In this regard it is noted that areas are reserved in memory for each block. In the case of 50% compression, each reserved area is the size of half the original block. Thus each compressed block will fit in the memory area reserved for it due to the fact that bits are counted and the output of compressor 322 is used if necessary. If preferred compressor 316 is successful in achieving greater than the target compression amount, the output of compressor 316 is used, and some of the reserved memory space is not used by the compressed block data. That is, each compressed block begins to fill its reserved memory area beginning with a predetermined starting address and continuing to an address less than the last address reserved for that block. This process is discussed in connection with FIG. 2.

It is desirable for block based compression to be capable of achieving both high compression efficiency and easy access to each pixel of a pixel block, even though these two results are competing in nature. That is, high compression efficiency requires a large block size, while easy access to pixels requires a small block size. It has been found that both of these characteristics can be substantially achieved with pixel block sizes of 8×8 pixels and 16×4 pixels. The blocks are formed into the required N×N pixel sizes in unit 10 as mentioned previously.

Figure 4:
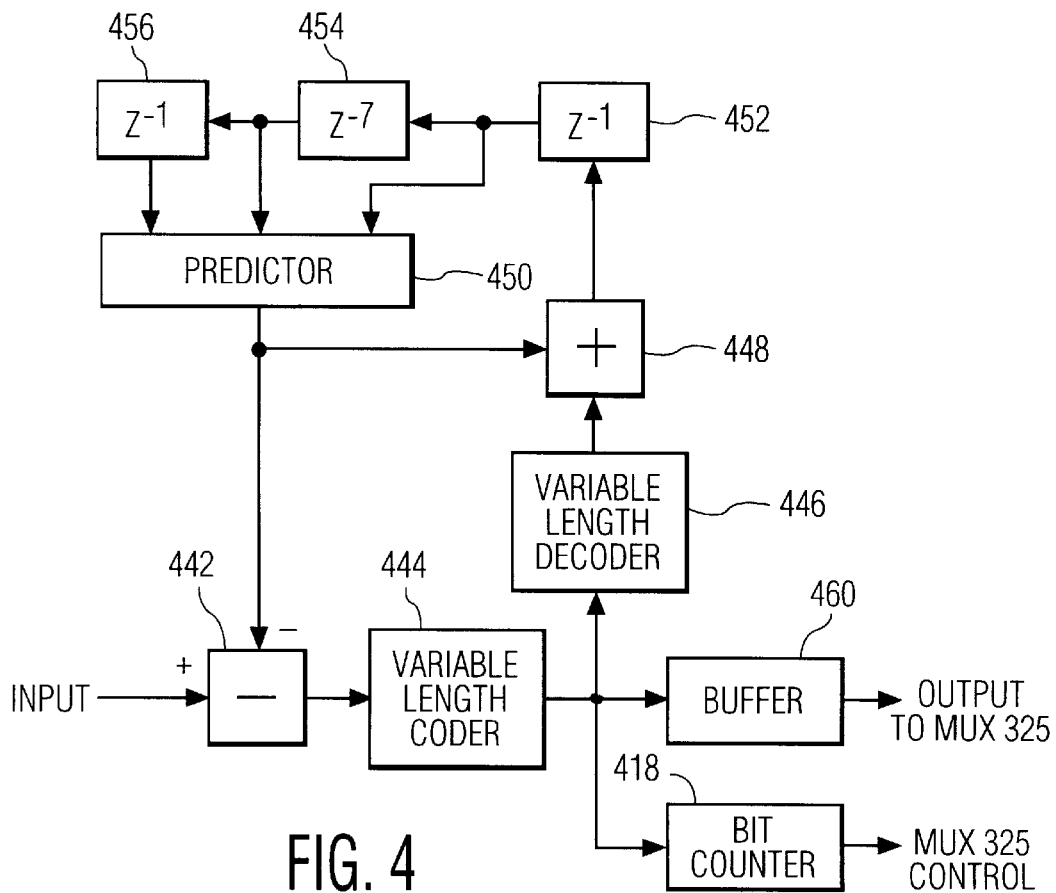
FIGS. 4 and 5 show additional details of the network of FIG. 3.
Figure 5:
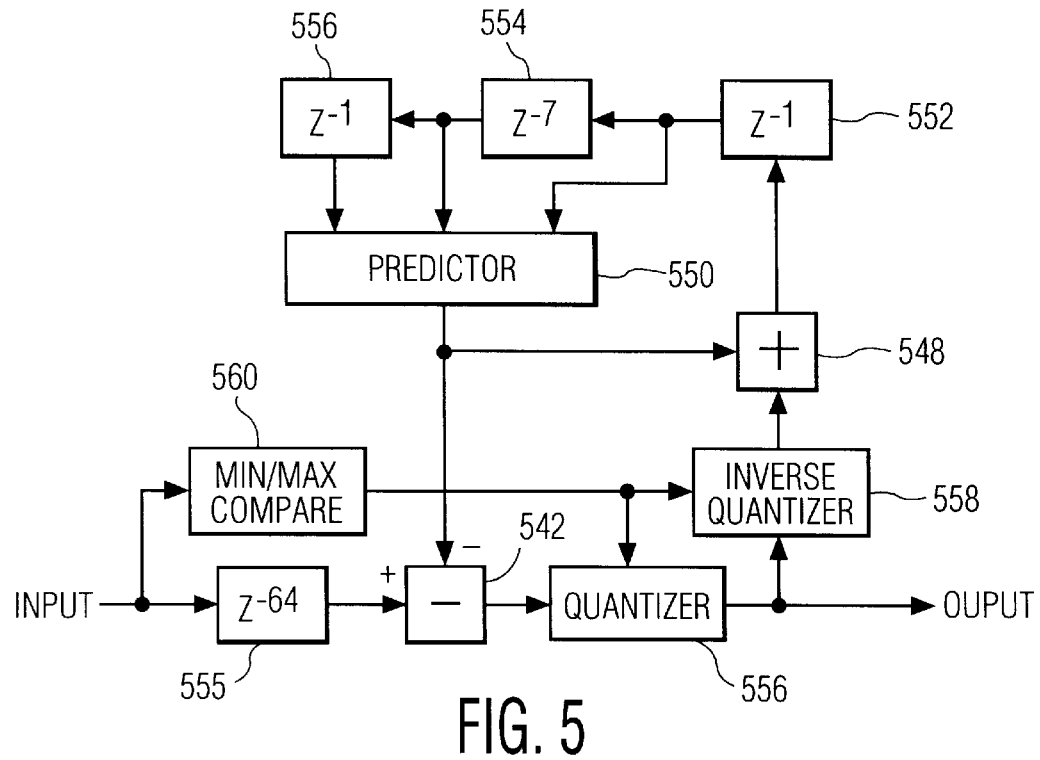
Figure 6:
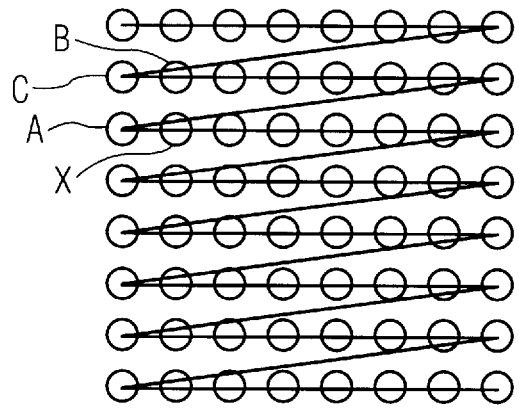
FIGS. 6 and 7 depict pixel arrangements helpful in understanding aspects of the operation of the networks shown in FIGS. 4 and 5.

In this example each field based pixel block is scanned in a raster manner as shown in FIG. 6, from left to right in a downward direction. This scanning is done in both units 316 and 322 using delay elements 452–456 and delay elements 552–556 as shown in FIGS. 4 and 5 respectively, as will be discussed. The variable compression network is shown in FIG. 4. This network uses a DPCM loop with adaptive prediction to produce a difference signal (residual) using known techniques. This difference is variable length coded, and the resulting number of coded difference bits is monitored to indicate whether or not the desired compression factor was achieved for the current block.

In FIG. 4, differencing network 442 produces an output representing the difference (residual) between input pixel values applied to a non-inverting input (+) of unit 442 and predicted pixel values applied to an inverting input (−) of unit 442, respectively. The predicted value is obtained using a DPCM processing loop including differencer 442, variable length coder 444 and a variable length decoder 446. which performs the inverse of the coding operation performed by unit 444. The variable length coder can include an optional high resolution quantizer and an entropy encoder (eg., a Huffman coder) for lossless or near lossless compression. The variable length decoder includes an inverse quantizer and entropy decoder. The inversely decoded output from unit 446 is summed in a unit 448 with an output from a prediction network including a predictor 450 and associated pixel delay elements 452, 454 and 456. These elements provide delays of one, seven and one pixels, respectively. A predicted pixel value output from unit 450 is applied to inputs of adder 448 and differencer 442.

Figure 7:
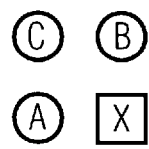

FIG. 7 shows an exemplary arrangement of a group of four pixels A, B, C and X (the pixel to be predicted) associated with the predictive processing and coding operation of the DPCM network.

This group of pixels is also referenced in the pixel block shown in FIG. 6. In this example pixel B is delayed by a one pixel interval relative to pixel C, pixel A is delayed by a seven pixel interval relative to pixel B, and pixel X is delayed one pixel interval relative to pixel A. The DPCM prediction process is well-known and will be discussed subsequently. Compressed pixel data from the output of variable length coder 444 are buffered by a unit 460 before being provided to MUX 325 of FIG. 3. Buffer 460 stores the output of the variable compression process until the entire block has been processed, at which time it can be determined whether or not the target compression factor has been reached.

The bit count of each compressed block output from coder 444 is monitored by bit counter 418, which may be implemented by any of several known techniques. After each pixel block has been variably compressed, counter 418 provides a Control output signal if the compressed bit count is at or below a predetermined threshold, indicating that the desired amount of compression has been reached or exceeded by the variable compressor. This Control signal is applied to the switching control input of MUX 325 for causing MUX 325 to convey the output from the variable length compressor to the utilization network. Otherwise, the compressed block output (for the same pixel block) from the fixed length compressor is conveyed to the utilization network.

The fixed compression network is shown in FIG. 5. This network also uses a DPCM loop with adaptive prediction, as in the case of the variable compressor. In FIG. 5 elements 548, 550, 552, 552, 554 and 556 perform the same functions as corresponding elements in FIG. 4. Differencing network 542 also serves the same purpose as unit 442 in FIG. 4 for producing a residual pixel value, but in a slightly different context as discussed below.

The fixed compression network uses non-linear quantizing of the difference (residual) pixel values provided at the output of unit 542 as a result of DPCM processing. A non-inverting input (+) of unit 542 receives input pixel values delayed 64 pixel intervals by a 64-pixel delay element 555. The inverting input (−) of unit 542 receives predicted pixel values from predictor 550. The residual pixel value output from unit 542 is subjected to quantization and inverse quantization by units 556 and 558 respectively. The quantization provided by unit 556 is fixed and guarantees a desired fixed amount of data compression. For example, to achieve 50% compression of an 8-bit data word, unit 556 removes the last four least significant bits. The amount of fixed compression is not less than the desired amount of compression. Units 556 and 558 operate under control of a Min/Max comparison network 560 which determines the minimum and maximum pixel values for each pixel block.

Quantizer 556 could also be arranged to use a fixed quantizer rule. However, it is more efficient to adapt the quantizer rule according to the minumum and maximum pixel values associated with the block being processed. Min/Max comparison unit 560 determines these values. Element 555 provides the time delay needed for the minimum and maximum values of all 64 pixels of a given block to be examined before the first pixel of the block is processed.

Referring back to FIG. 3, compressor 322 has no inherent delay, but the combination of the min/max comparison and delay element 555 (FIG. 5) causes compressor 322 to exhibit a one block delay, which matches the one block delay exhibited by the variable compression path. The fixed length compression network evaluates each of the 64 pixel values of each 8×8 pixel block twice to determine the minimum and maximum pixel values of that block. This process is facilitated by the 64 pixel (one block) delay provided by element 555. The minimum and maximum values are used to adaptively select between non-linear quantizing rules to be used for each block being processed. The two pass approach needed to evaluate each block twice does not add additional latency to the system because of the one block latency exhibited by buffer 460 of the variable compression path when determining if the variable compressor has achieved the desired compression.

As noted above, when compressors 316 and 322 are arranged in parallel and fixed compressor employs min/max comparison, there is a one block delay in compressor 322. Variable compressor 316 does not have an inherent one block delay, so bit buffer 460 holds the bits one block time longer in order to wait for the output of compressor 322. If fixed compressor 322 did not use min/max comparison, then compressor 322 would not exhibit a one block delay. Variable compressor 316 does not exhibit an inherent one block delay due to buffer 460. Buffer 460 stores the bits of compressor 316 before a decision is made regarding which of the variable or fixed compression outputs to use. Bit counter 318 determines which output to use when the variable and fixed compression networks are arranged in parallel.

Figure 8:
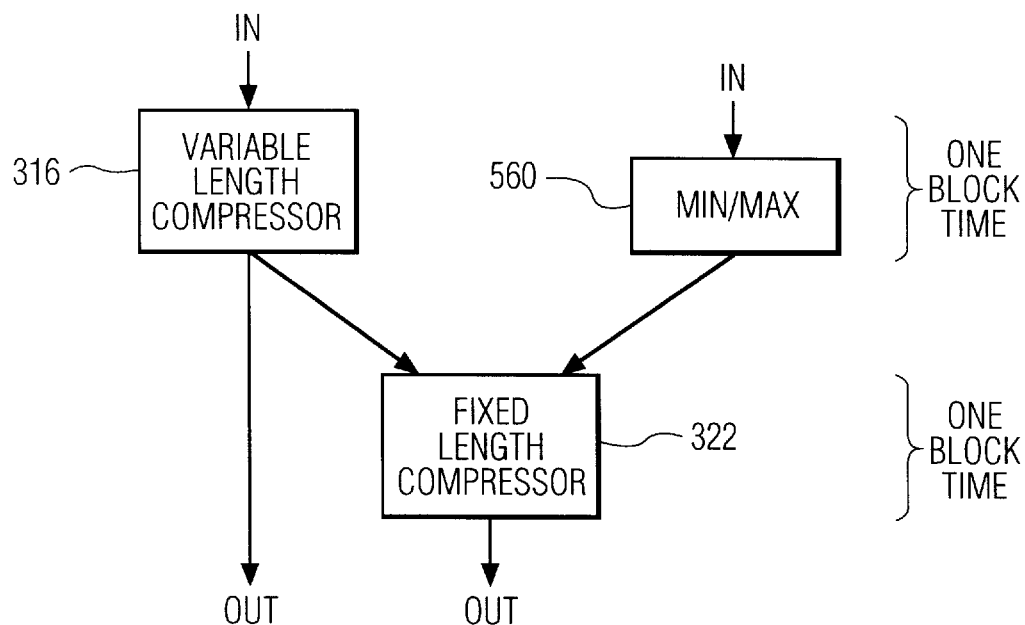
FIG. 8 depicts an alternative dual path compression network.

However, compressors 316 and 322 need not be arranged in parallel, as shown in FIG. 8. In this case compressor 316 processes a pixel block first, and at the same time Min/Max comparison unit 560 determines the minimum and maximum pixel values for the block, as explained previously. After a one block delay, it will be known whether or not compressor 316 has achieved the target compression, and thereby whether or not fixed compressor 322 needs to process the block. If variable compressor 316 has achieved the target compression factor, it will output the variable-compressed block to the frame memory. Otherwise, unit 322 will compress the block. Since compressors 316 and 322 may contain similar architecture and functional elements, this implementation advantageously allows such similar elements used for variable compression in unit 316 to be used again for fixed length compression in unit 322.

It is not essential to adaptively change the quantizer rules with respect to quantizer 556 of FIG. 5. Simple linear quantization could be used. Adapting the quantizer rule according to the min/max pixel values reduces the amount of loss. Each block is scanned once to find the min and max pixel values. Knowledge of these values allows an appropriate quantizer rule to be chosen before the first (residual) value is quantized. Element 555 delays the first pixel until the quantizer rule is established, which rule is also used by inverse quantizer 558. This may require that signalling bits be added to the datastream to notify the decompression function of the quantizer rule that is being used.

The quantizer may be considered as a form of look-up table, with output bits from unit 542 representing addresses. Quantizer 556 outputs 4-bit data in the case of 50% compression. The output of quantizer 556 is an index that is used by unit 558 to approximate the output of unit 542. This is where a loss may occur, since if input to unit 558 is only 4-bit data, only 16 data combinations are possible, while unit 542 can provide up to 256 possible outputs. The fixed compression network of FIG. 5 does not require an output buffer.

In this embodiment the same DPCM predictive coding process is employed by the compression networks of FIGS. 4 and 5. The current pixel being coded is predicted by using previously coded pixels, which are known to decompressors 32 and 34 (FIG. 1). The prediction process can be explained with reference to FIG. 7, where pixel X is the pixel value to be predictively coded. Pixels A, B and C have been predictively coded previously and are known to the decompression section. A prediction of X, $X_{pred}$, uses the values of A, B and C in accordance with the following pseudo code, which describes the algorithm to be used:

if ($|A-C| < e_1$ && $|B-C| > e_2$), $X_{pred} = B$
else if ($|B-C| < e_1$ && $|A-C| > e_2$), $X_{pred} = A$
else $X_{pred} = (A+B)/2$ Values e1 and e2 are constants representing predetermined thresholds. This algorithm is used only for pixels not located in the first row or the first column of the block being processed. Some exceptions are handled as follows: the first pixel in a block is coded very finely without reference to any other pixel, pixels in the first row use pixel value A as the predictor, and pixels in the first column use pixel value B as the predictor. Basically, this algorithm attempts to detect an edge. In the first case, a vertical edge is suggested between pixels C and B and between pixels A and X. Thus B is the best predictor. The second case suggests a horizontal edge between A and C and between B and X. Thus A is the best predictor. In the third case, no obvious edge is found. In this case both A and B are equally good predictors, so their average value is used.

The disclosed block based data compression network is advantageously used to process MPEG compatible datawords. The network exhibits nearly lossless compression for reducing the amount of memory needed to store 8×8 luminance data or 4×4 U,V (chrominance) data. The amount of compression is selectable and may be 25% or 50%, for example. Low contrast, low detail image blocks are usually losslessly compressed, while high contrast, high detail data blocks may experience some acceptable loss, particularly in the case of 50% data compression. Although in some cases decompressed pixel blocks may exhibit differences compared to original pixel blocks, the disclosed compression system is preferred over horizontal detail reduction for reducing memory requirements. The compression system shown in FIG. 3 can be used with all Profiles and all Levels of the MPEG specification, as well as to other digital data processing schemes.

Although compressor 30 advantageously employs dual compression networks as shown in FIGS. 3 and 8, one of the compression networks can be removed to simplify the system. For example, to simplify the hardware design it may be sufficient in some system to use the fixed length compression network alone.

What is claimed is:

1. In a system for processing image representative digital data, an MPEG compatible decoder comprising:
    an input network for receiving a datastream of compressed image representative data;
    a decompressor for decompressing compressed data from said input network;
    a motion information processing network for processing decompressed data from said decompressor;
    a memory unit for storing data processed by said motion processing network;
    an output image processor for processing data stored by said memory unit; and
    a compressor for compressing data processed by said motion processing network before being stored by said memory unit.

2. A system according to claim 1, wherein
    said image representative data comprises blocks of image pixel data of a predetermined size.

3. A system according to claim 1, wherein said motion processing network comprises:
    a motion compensation network with an input for receiving stored data from said memory, and an output for providing motion compensated data;
    a combiner for combining said motion compensated data with said decompressed data from said decompressor; and
    said compressor for conveying combined data from said combiner to an input of said memory unit.

4. A system according to claim 3 and further including
    a second decompressor for decompressing output data from said memory unit before being provided to said motion compensation network.

5. A system according to claim 3 and further including
    a third decompressor for decompressing output data from said memory unit before being conveyed to said output image processor.

6. A system according to claim 1, wherein
    said compressor is a block-based compressor.

7. A system according to claim 1, wherein said compressor comprises:
    a first compressor exhibiting a first data compression characteristic;
    a second compressor exhibiting a different second data compression characteristic and receiving data to be compressed concurrent with said first compressor; and
    a selection network for conveying compressed data exhibiting a desired compression factor from one or the other of said first and second compressors to said memory unit.

8. A system according to claim 7, wherein
    said first compressor exhibits a variable compression characteristic; and
    said second compressor exhibits a fixed compression characteristic.

9. A system according to claim 8, wherein
    said variable compression is preferred to said fixed compression such that said selection network selects (a) variable compressed data from said first compressor when said variable compressed data exhibits a predetermined desired compression factor or greater, and (b) fixed compressed data from said second compressor when said variable compressed data exhibits less than said compression factor.

10. In a system for processing image representative digital data, an MPEG compatible decoder comprising:
    an input network for receiving a data stream of compressed image representative data;
    a decompressor for decompressing compressed data from said input network;
    a motion information processing network for processing decompressed data from said decompressor;
    a memory unit for storing data processed by said motion processing network;
    an output image processor for processing data stored by said memory unit; and
    a compressor for compressing data processed by said motion processing network before being stored by said memory unit; wherein said compressor comprises
        a block based first compressor exhibiting a variable data compression characteristic;
        a block based second compressor exhibiting a fixed data compression characteristic, said second compressor operating in parallel with said first compressor;
    means for applying blocks of image data to both said first and second compressors concurrently;
    means coupled to said first compressor for determining if a data block processed by said first compressor exhibits a desired compression factor; and
    a selection network for selectively conveying to said memory unit (a) variable compressed data from said first compressor when said variable compressed data exhibits a desired predetermined compression factor or greater, and (b) fixed compressed data from said second compressor when said variable compressed data exhibits less than said compression factor.

11. In a system for processing image representative digital data, an MPEG compatible decoder comprising:

an decoder for decoding a received datastream of compressed image representative data;

a decompressor for decompressing compressed data from said decoder;

a memory unit with an input and an output;

a block compressor for providing compressed data to said input of said memory unit;

a block decompressor for decompressing data provided from said output of said memory unit;

a motion information processor for processing decompressed data from said block decompressor;

a combiner for combining output signals from said decompressor and from said motion processor to produce data for application to said compressor; and an output image processor for processing data stored by said memory unit.

12. A method for processing encoded MPEG compatible image representative digital input data comprising the steps of:

(a) decoding said input data to produce decoded data;

(b) decompressing said decoded data to produce decompressed data;

(c) compressing information including said decompressed data to produce compressed information;

(d) storing said compressed information in memory;

(e) decompressing information stored in said memory to produce decompressed stored information;

(f) motion processing said decompressed stored information to produce motion information; and (g) combining said motion information with said decompressed data to produce said information compressed in said compressing step (c).

13. A method according to claim 12, wherein said compressing step (c) performs block-based compression; and said decompression step (e) performs block-based decompression.

14. A method according to claim 12, further including the steps of (h) decompressing information stored in said memory to produce output image information for display; and (i) conveying said image information for display to a display processor.

15. In a system for processing input image representative information, an MPEG compatible decoder comprising:

a decompressor for decompressing an input datastream containing MPEG coded data to produce decompressed data;

a compressor for compressing said decompressed data to produce recompressed data;

a memory for storing said recompressed data;

an output network for processing data stored by said memory; and a motion information processing network coupled to said memory and to said compressor for processing image motion information associated with said input image representative information.

16. A system according to claim 15 and further including:

a further decompressor for decompressing data stored by said memory before being provided to said output network, wherein said compressor and said further decompressor are included in a DPCM loop.

17. A method of processing a digital datastream of MPEG coded image representative data comprising the steps of;

(a) decompressing said input datastream of MPEG coded data or produce decompressed data;

(b) compressing said decompressed data to produce recompressed data;

(c) storing said recompressed data;

(d) providing said stored recompressed data to an image information processing network; and (e) Processing image motion information in association with said compressing step and said storing step.

18. A method according to claim 17, further comprising the step of (e) decompressing said stored data before providing said stored data to said image processing network, wherein said compressing step (c) and said decompressing step (e) are included in a DPCM loop.

* * * * *